(12) United States Patent
Seong et al.

(10) Patent No.: US 10,040,057 B1
(45) Date of Patent: Aug. 7, 2018

(54) CATALYTIC NANOSHEETS TO LOWER SOOT LIGHT OFF TEMPERATURES, METHOD FOR MAKING NANOSHEETS TO LOWER SOOT LIGHT OFF TEMPERATURES

(71) Applicants: Hee Je Seong, Aurora, IL (US); Seungmok Choi, Naperville, IL (US)

(72) Inventors: Hee Je Seong, Aurora, IL (US); Seungmok Choi, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/643,108

(22) Filed: Jul. 6, 2017

(51) Int. Cl.
| | | |
|---|---|---|
| *B01D 46/00* | (2006.01) | |
| *B01D 53/34* | (2006.01) | |
| *B01D 53/62* | (2006.01) | |
| *B01D 53/72* | (2006.01) | |
| *B01D 53/86* | (2006.01) | |
| *B01J 8/00* | (2006.01) | |
| *B01J 23/75* | (2006.01) | |
| *B01J 23/889* | (2006.01) | |
| *B01J 23/78* | (2006.01) | |
| *B01J 23/888* | (2006.01) | |
| *B01J 23/83* | (2006.01) | |
| *B01J 35/04* | (2006.01) | |
| *B01J 37/04* | (2006.01) | |
| *B01J 37/03* | (2006.01) | |
| *B01J 37/00* | (2006.01) | |
| *B01J 37/08* | (2006.01) | |
| *B01D 53/94* | (2006.01) | |
| *F01N 3/28* | (2006.01) | |

(52) U.S. Cl.
CPC ........ *B01J 23/8892* (2013.01); *B01D 53/944* (2013.01); *B01J 23/75* (2013.01); *B01J 23/78* (2013.01); *B01J 23/83* (2013.01); *B01J 23/888* (2013.01); *B01J 35/04* (2013.01); *B01J 37/009* (2013.01); *B01J 37/031* (2013.01); *B01J 37/04* (2013.01); *B01J 37/08* (2013.01); *F01N 3/2842* (2013.01); *B01D 2255/2022* (2013.01); *B01D 2255/2065* (2013.01); *B01D 2255/2073* (2013.01); *B01D 2255/20746* (2013.01); *B01D 2255/20776* (2013.01); *F01N 2370/02* (2013.01)

(58) Field of Classification Search
CPC ............. B01D 53/864; B01D 53/8668; B01D 2255/20746; B01D 2255/202; B01D 2255/65; B01D 2257/502; B01D 2257/702; B01D 2257/708; B01D 2279/30; B01D 46/0061; B01D 46/2418; B01J 8/005; B01J 15/005; B01J 20/28042; B01J 23/75; B01J 23/78; B01J 35/04; B01J 37/04; B01J 2219/2429; F01N 3/0222; F01N 3/035; F01N 3/103; B82Y 3/0095; B82Y 40/00
See application file for complete search history.

(56) References Cited

U.S. PATENT DOCUMENTS

| | | | |
|---|---|---|---|
| 7,771,669 B2 | 8/2010 | Chigapov et al. | |
| 8,137,636 B2 | 3/2012 | Chigapov et al. | |
| 8,188,153 B2 * | 5/2012 | Wang | B01J 19/0093 422/221 |
| 8,399,527 B1 * | 3/2013 | Brown | C10G 2/332 518/700 |
| 2013/0034472 A1 * | 2/2013 | Cantrell | B01D 53/9422 422/177 |
| 2013/0195741 A1 | 8/2013 | Deeba et al. | |
| 2013/0345048 A1 | 12/2013 | McGinn et al. | |
| 2016/0060782 A1 * | 3/2016 | Kim | B01D 53/8628 205/122 |
| 2016/0177794 A1 | 6/2016 | Suib et al. | |

* cited by examiner

*Primary Examiner* — Timothy C Vanoy
(74) *Attorney, Agent, or Firm* — Cherskov Flaynik & Gurda, LLC (57) ABSTRACT

The invention provides a method for oxidizing chemical, the method having the steps of contacting soot to a catalyst defining a plurality of flat substrates forming a monolith, wherein any one of the substrates has a thickness no greater than 30 nm. Also provided is a catalyst for oxidizing chemical, the catalyst have a morphology having layered plates, wherein any plate is no more than 30 nm thick. The invention also provides a method for producing an oxidation catalyst, the method having the steps of combining a cobalt compound with a potassium compound to create a solution; contacting the solution with a reducing agent for a time and at a temperature sufficient to oxidize the cobalt compound and form a precipitate of the oxidized cobalt compound; filtering the precipitate; and calcining the filtered precipitate.

20 Claims, 10 Drawing Sheets

| Example | Name | Temperature (°C) T10 | T50 | T90 | K$_2$SO$_4$ used | sol'n Temp (°C) | Oxalic acid conc. (M) | OA solvent | Solid collection | Active catalyst sol'n molarity ratio |
|---|---|---|---|---|---|---|---|---|---|---|
| 1 | Co-6K | 360.6 | 399.3 | 447.2 | O | 60 | 0.1 | Ethanol | Filtering | Co:K=1:6 |
| 2 | Co | 381.7 | 440.2 | 510.4 | X | 60 | 0.1 | Ethanol | Filtering | Co |
| 3 | Co-6K-W | 425.9 | 454.6 | 494.8 | O | 60 | 0.1 | Water | Filtering | Co:K=1:6 |
| 4 | Co-6K-25 | 432.8 | 484.6 | 558.3 | O | 25 | 0.1 | Ethanol | Filtering | Co:K=1:6 |
| 5 | Co-6K-80 | 403.9 | 465.6 | 528.1 | O | 80 | 0.1 | Ethanol | Filtering | Co:K=1:6 |
| 6 | Co-6K-OA004 | 393.6 | 440.2 | 475.1 | O | 60 | 0.04 | Ethanol | Filtering | Co:K=1:6 |
| 7 | Co-6K-OA02 | 353.5 | 377.9 | 400.1 | O | 60 | 0.2 | Ethanol | Filtering | Co:K=1:6 |
| 8 | Co-12K | 366.1 | 413.4 | 487.1 | O | 60 | 0.1 | Ethanol | Filtering | Co:K=1:12 |
| 9 | Co-3Li | 403.2 | 492.8 | 589.2 | O | 60 | 0.1 | Ethanol | Filtering | Co:Li=1:3 |
| 10 | Co-6Na | 440.2 | 484.8 | 547.2 | O | 60 | 0.1 | Ethanol | Filtering | Co:Na=1:6 |
| 11 | CoCu-12K | 369.6 | 418.8 | 500.5 | O | 60 | 0.1 | Ethanol | Filtering | Co:Cu:K=1:1:12 |
| 12 | CoMn-12K | 378 | 408.9 | 461.4 | O | 60 | 0.1 | Ethanol | Filtering | Co:Mn:K=1:1:12 |
| 13 | CoCe-12K | 321.1 | 365.3 | 392.8 | O | 60 | 0.1 | Ethanol | Filtering | Co:Ce:K=1:1:12 |
| 14 | CoCe | 379.6 | 463.1 | 508.2 | X | 60 | 0.1 | Ethanol | Filtering | Co:Ce=1:1 |
| 15 | Co-6K/Ce-rotavap | 336.8 | 398 | 442.4 | O | 60 | 0.1 | Ethanol | Rotary evaporating | Co:K=1:6 |
| 16 | Co-6K/Ce-filter | 441.1 | 513.9 | 558 | O | 60 | 0.1 | Ethanol | Filtering | Co:K=1:6 |
| 17 | Co-6K/Al-rotavap | 394.9 | 439.6 | 469.1 | O | 60 | 0.1 | Ethanol | Rotary evaporating | Co:K=1:6 |
| 18 | Co-6K/Al-filter | 485.6 | 554.5 | 588.9 | O | 60 | 0.1 | Ethanol | Filtering | Co:K=1:6 |
| 19 | Co-6K/nano Ce-rotavap | 316 | 363.4 | 394.7 | O | 60 | 0.1 | Ethanol | Rotary evaporating | Co:K=1:6 |
| 20 | Co-6K/nano Ce-filter | 412.3 | 470.4 | 502 | O | 60 | 0.1 | Ethanol | Filtering | Co:K=1:6 |
| 21 | Co-6K+Ce(NO3)3-rotavap | 428.3 | 489.2 | 521.6 | O | 60 | 0.1 | Ethanol | Rotary evaporating | Co:K=1:6 |
| 22 | K$_2$SO$_4$ | 459.9 | 507.7 | 534.1 | | | | | | |
| 23 | nano CeO$_2$ | 425 | 495.2 | 540.1 | | | | | | |
| 24 | Printex-U (PU) only | 521.5 | 581.1 | 620.5 | | | | | | |

FIG. 7

CATALYTIC NANOSHEETS TO LOWER SOOT LIGHT OFF TEMPERATURES, METHOD FOR MAKING NANOSHEETS TO LOWER SOOT LIGHT OFF TEMPERATURES

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to soot reduction catalysts and more specifically, this invention relates to a catalyst that reduces the ignition temperature of soot without the need for platinum group metal (PGM) materials.

2. Background of the Invention

Particulate matter emissions from vehicles have been stringently regulated due to their hazardous impacts on human health and environments. Filtration systems are used to trap those emissions using metal foam, cordierite and SiC.

Any particulate matter trapped in filters needs to be oxidized through the regeneration process. Otherwise, pressure drop occurs across the filter, which significantly reduces engine combustion and efficiency.

Since soot oxidation is achieved when temperatures are more than 550° C. and usually at over 600° C. with no catalyst present, it is not enabled at normal vehicle running temperatures, which are typically below 500° C. Therefore, various active regeneration strategies are used, such as post fuel injection, and electric heaters in combination with catalysts to elevate exhaust temperatures. The objective here is to change exhaust gas compositions to maximize soot oxidation.

However, these active regeneration strategies require additional fuel consumption, resulting in decreased energy efficiencies. Platinum group metals (PGMs) are often coated on filters as catalysts intended to reduce operating temperatures of the regeneration process. However, the lower regeneration temperatures enabled by these catalysts are insufficient for soot oxidation. Also, costly PGMs demand development of cost-effective non-PGM catalysts to lower filter manufacturing costs.

Figure 1:
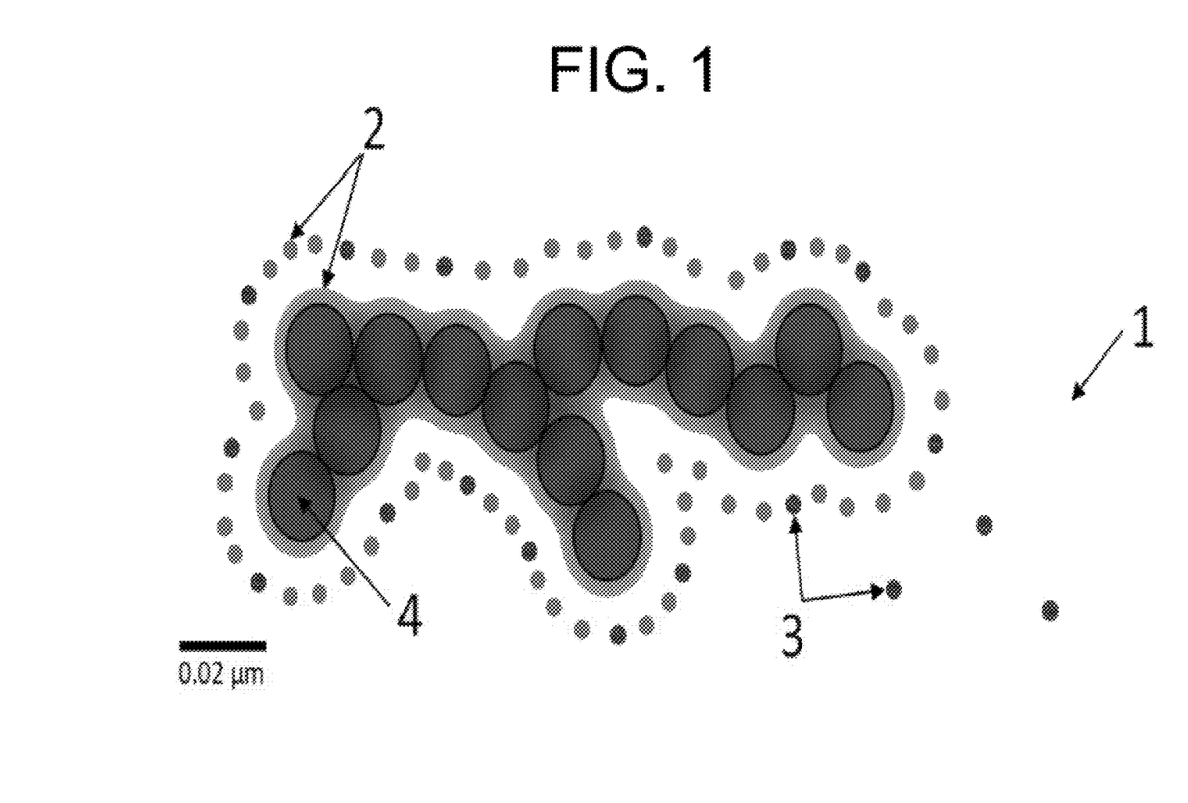
FIG. 1 is schematic diagram of a combustion-generated soot particle.

Diesel fuel use in vehicles continues to increase due to its higher torque characteristics at lower engine speeds. However, soot remains as an intractable problem of these and other engines. FIG. 1 is a schematic diagram of a typical soot complex from combustion sources, designated as numeral 1. That complex comprises a soluble organic fraction 2, sulfate particles 3, and soot particles 4.

Diesel exhaust temperatures range from between about 250° C. to 450° C. These temperatures are too low to regenerate catalysts used to capture soot before leaving the exhaust pipe.

A need exists in the art for a catalyst to decrease oxidation temperature of soot generated by engines. There is also a need for an economical method for producing such a catalyst. The catalyst should enable the ignition of soot at normal engine operating temperatures so as to confer its passive regeneration, such that no active regeneration of catalysts is required. Also, the catalyst should comprise relatively inexpensive materials (compared to PGMs) so as to facilitate widespread adoption.

SUMMARY OF INVENTION

An object of the invention is to provide an exhaust catalyst that overcomes many of the drawbacks of the prior art.

Another object of the invention is to provide a catalyst for igniting chemicals such as CO, or $CH_4$, non-methane total hydrocarbons, volatile organic carbon, soot, and combinations thereof. A feature of the invention is that it facilitates the oxidation or otherwise consumption of chemical at temperatures at between about 300° C. and 400° C. An advantage of the invention is that the catalyst is continually regenerated when utilized within an exhaust treatment system normally operating at these temperatures. As such, the catalyst enables passive regeneration of filters eliminates the need for active regeneration.

Yet another object of the present invention is to provide a method for producing a non-PGM catalyst for igniting soot. A feature of the invention is the utilization of sulfates such as $K_2SO_4$, $K_2S_2O_8$, $Na_2SO_4$, $LiSO_4$, $MgSO_4$ and $SnSO_4$, and potassium-containing chemicals such as $KNO_3$, $KCl$ and $K_2CO_3$ as a reactant in producing the catalyst. An advantage of the invention is that sheet structures are generated comprised of a plurality of spheres of approximately 10 nanometers (nm) to approximately 30 nm in diameter, wherein the spheres and overlaying sheets are bonded by Van der Waals forces. This structure forms interstices between the spheres of individual sheets and between the sheets themselves, thereby maximizing catalytic surface areas and increasing surface oxygen concentrations to facilitate lower soot light off and oxidation temperatures.

Briefly, the invention provides a method for oxidizing soot, the method comprising contacting soot to a catalyst defining a plurality of flat substrates forming a monolith, wherein any one of the substrates has a thickness no greater than 30 nm.

Also provided is a catalyst for oxidizing soot, the catalyst have a morphology comprising layered plates, wherein any one plate is no more than 30 nm thick.

The invention further provides a method for producing an oxidation catalyst, the method comprising combining a cobalt compound with an alkali metal compound to create a solution; contacting the solution with a precipitating agent for a time and at a temperature sufficient to oxidize the cobalt compound and form a precipitate of the cobalt compound as an intermediate; filtering the precipitate; and calcining the filtered precipitate.

BRIEF DESCRIPTION OF DRAWING

The invention together with the above and other objects and advantages will be best understood from the following detailed description of the preferred embodiment of the invention shown in the accompanying drawings, wherein:

FIG. 6 is a chart of catalyst activity comparing neat carbon black with catalyst, in accordance with features of the present invention.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a catalyst for oxidizing chemicals and a method for oxidizing chemicals such as soot.

Figure 2A:
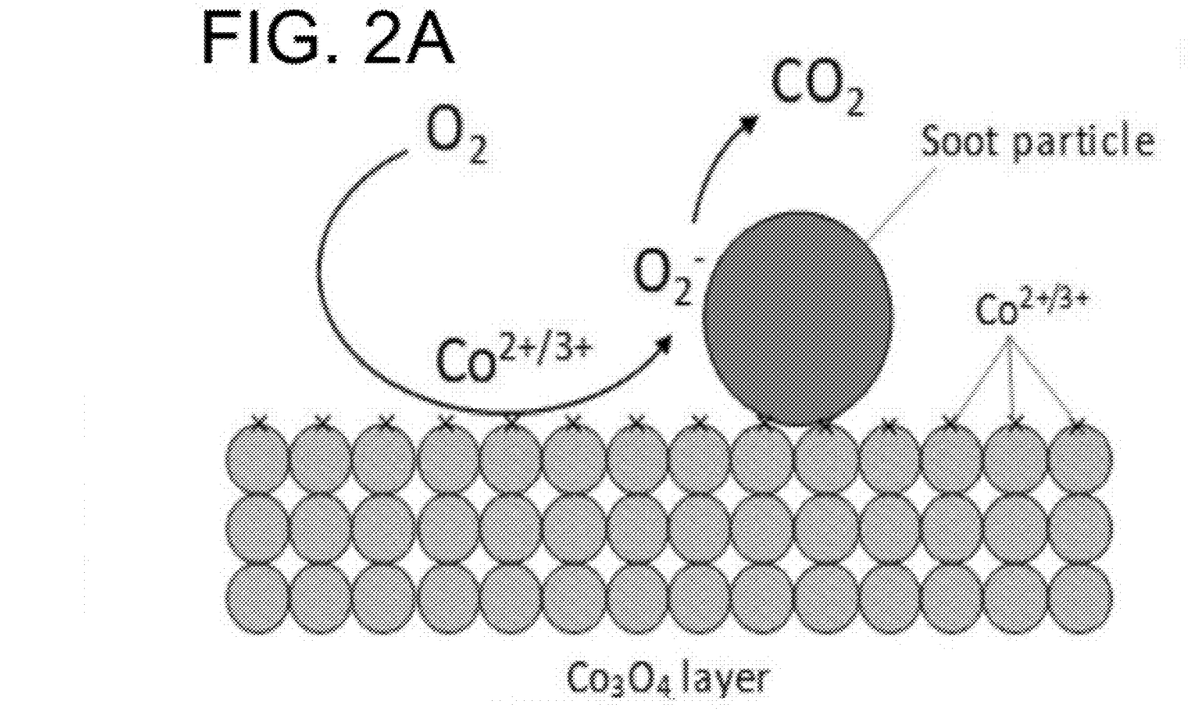
FIG. 2A is a s schematic diagram of a soot oxidation mechanism conferred by the subject catalyst, in accordance with features of the present invention.
Figure 2B:
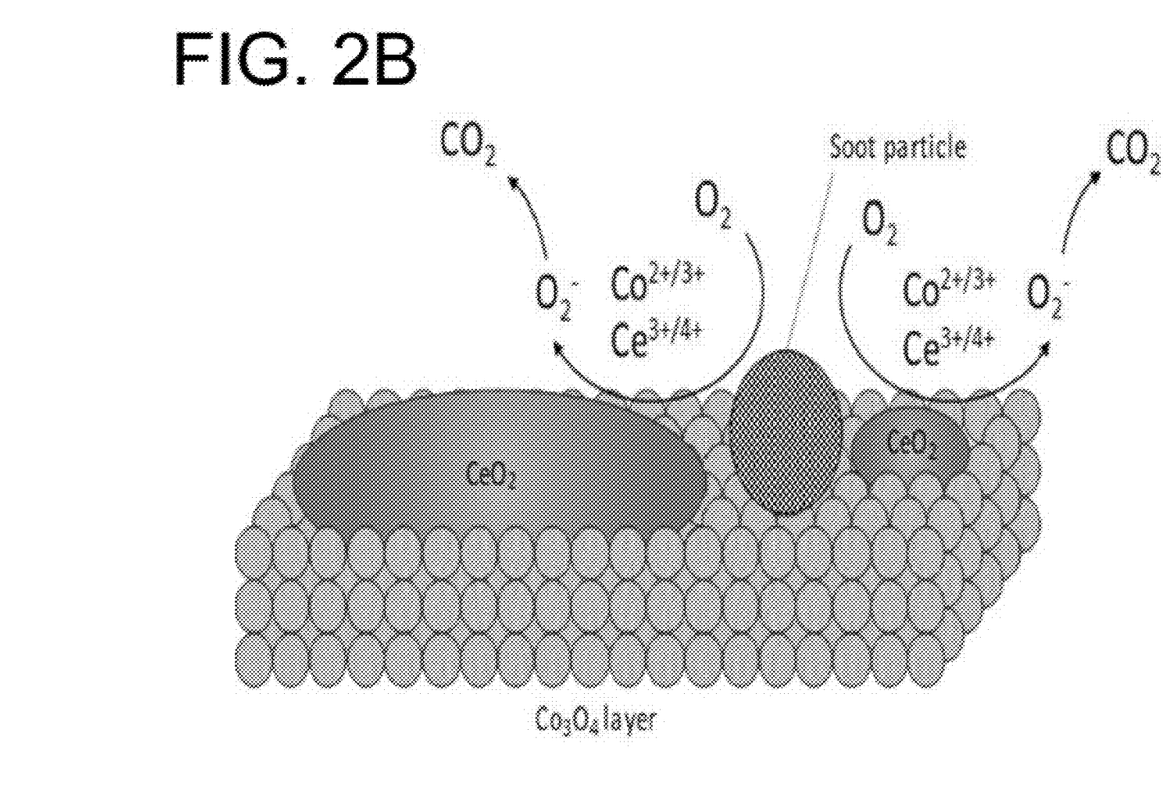
FIG. 2B is another schematic diagram of a soot oxidation mechanism, in accordance with features of the present invented catalyst structure.

FIGS. 2A and B are schematic diagrams for the oxidation reaction facilitated by the invented $Co_3O_4$ catalyst. As shown, atmospheric molecular oxygen contacts the catalyst and transforms to a reduced, ionized form of $O_2$, or $O_{2'}$ while the cobalt oxides, containing cobalt ions in two different oxidation states of $Co^{2+}$ and $Co^{3+}$, facilitate ionizing the $O_2$. The reactive, ionized molecular oxygen then reacts with the soot particles to generate carbon dioxide. This ionized molecular oxygen, initially adsorbed onto the catalyst surface, is more readily released from the surface than non-ionized oxygen, and is therefore more reactive than non-ionized molecular oxygen. This is why soot oxidation temperatures are much lower when the invented catalyst is utilized, even though the catalyst-soot contact is loose.

FIG. 2B shows an invented catalyst comprising both a $Co_3O_4$ under-layment, and regions of $CeO_2$ overlayments. In an embodiment of the invented structure, the under- and over-layments interact in a nonbinding (e.g. vander walls forces) fashion such that no ionic or covalent binding between the layments exist. Other embodiments may include chemical bonding between layments. Molar ratios of the under- to over-layments may vary from between about 10:1 to about 1:10.

Preparation
Detail

The catalyst was generated via the following chemistry as depicted in Equation 1:

$$K_2SO_4(aq) + CoCl_2 * 6H_2O(aq) + H_2C_2O_4 * 2H_2O(aq) \rightarrow$$
$$CoC_2O_4(s) + 2KCl(aq) + H_2SO_4 + 8H_2O \rightarrow Co_3O_4$$

Cobalt-containing catalysts were synthesized with alkali metal (e.g., K, Na) compounds as reactants. For example, K/Co molar ratios are selected between about 1:1 and 20:1, preferably between about 2:1 and about 10:1 and most preferably about 6:1. (See the last column in FIG. 6.)

Specifically, $Co_3O_4$ nanosheets were synthesized from a single precipitation between a Co oxide precursor (such as $CoCl_2$, $Co(NO_3)_2 \cdot 6H_2O$, $Co(CH_3COO)_2 \cdot 4H_2O$, and combinations thereof) and a precipitating agent such as oxalic acid, NaOH, $(NH_4)_2C_2O_4$ and urea. Also present in the reaction mixture is a potassium containing compound selected from the group consisting of $K_2SO_4$, $KNO_3$, $KCl$, $K_2CO_3$ and combinations thereof.

Sulfate compounds dissolved in water may also be present with a Co oxide precursor to make nanosheets, those sulfate compounds used as substituting agents of the aforementioned potassium containing compounds listed in the immediately proceeding paragraph. Suitable sulfates include, but are not limited to $K_2S_2O_8$, $Na_2SO_4$, $LiSO_4$, $MgSO_4$, $SnSO_4$, $CoSO_4$, $Cs_2SO_4$, $MnSO_4$ and $CrSO_4$.

Oxalic acid concentrations may range from 1 M to 0.001 M, and be dissolved in ethanol, water, diethyl ether, and a combination thereof. The unique catalyst structure and beneficial chemical properties of this process are related with mixing conditions and chemistry in the final solution. This explains why organic-hydroxyl moieties (such as alcohols generally, e.g., ethanol) work better than water, as these moieties may increase dispersion or mixing when the oxalic acid solution is added to Co/K solution. For example, 0.1 M solution provides a better catalyst than does 0.004 M (0.004 M means more ethanol solvent used), so more diluted solution in the final stage of oxalic acid solution+Co/K solution. Surprisingly and unexpectedly, it was found that high (e.g., at or above 1 M) local concentrations of oxalic acid solution while reacting with Co/K solution makes a superior catalyst. Aside from oxalic acid, other carboxylic acids (e.g., citric acid) may also react with $CoCl_2$ to form the precipitated catalyst.

Figure 3:
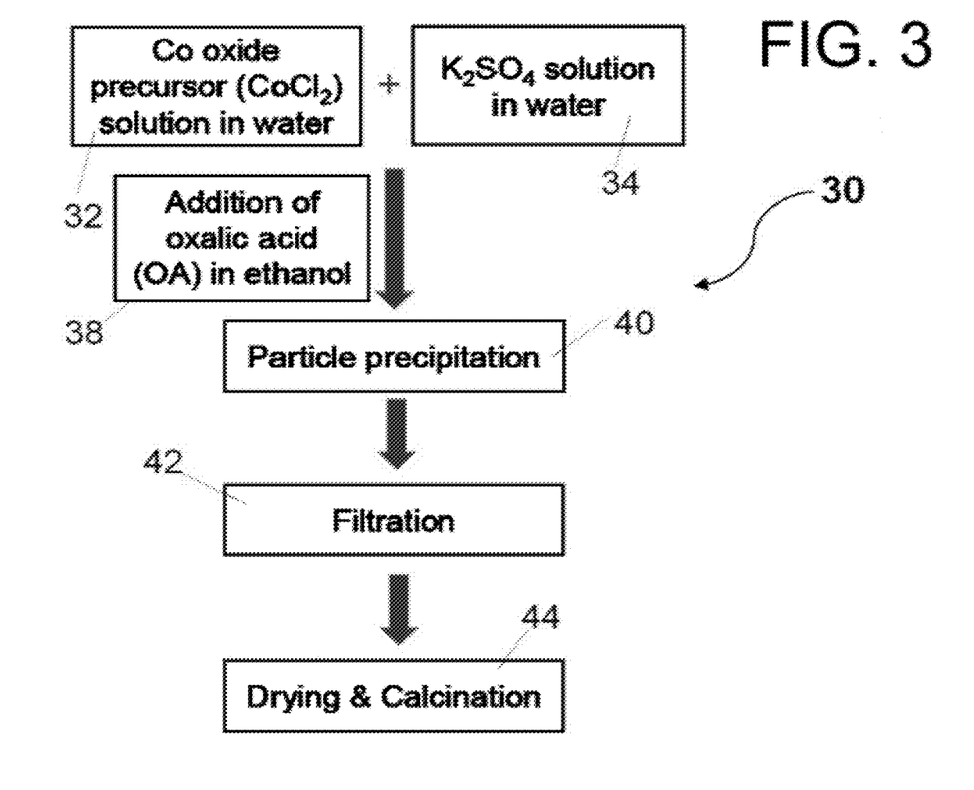
FIG. 3 is a flow chart of a method for producing low temperature catalyst, in accordance with features of the present invention.

FIG. 3 is a flow chart of a method for producing the invented catalysts, the method designated as numeral 30. $CoCl_2$ 32 is dissolved in water with $K_2SO_4$ 34 to create a solution. Oxalic acid 38 dissolved in ethyl alcohol was added to the solution.

Pink precipitated particles 40 appeared after the solution was stirred for several hours. These precipitated particles were filtered 42, dried (e.g., at 110 C for between 5 to 8 hours) and then calcined 44. One means for calcining was placing the particles in a muffle furnace maintained at a temperature to transform the $CoC_2O_4$ to $Co_3O_4$. Therefore, a suitable temperature range is from about 400° C. to about 600° C. As a data comparison, the $Co_3O_4$ catalyst was synthesized without $K_2SO_4$ under the same procedure.

The inventors have found that certain metal oxides can be used as reaction promoters, wherein the metal oxides form bi-metals or coatings on exterior surfaces of the catalysts. Initially, the dissolved precursor oxides are mixed with Cobalt precursor and $K_2SO_4$. Suitable promoters include transition metals and rare-earth metals, including but not limited to Ce, Mn, Cu, Cr, Ag, La, Pr, and combinations thereof.

For example, a Co:Ce:K=1:1:12 reactant molar ratio was auditioned in the following reaction sequence, depicted as Equation 2:

$$2[Ce(NO_3)_3 * 6H_2O + 3[H_2C_2O_4 * 2H_2O] \rightarrow \\ Ce_2(C_2O_4)_3 + 6HNO_3 + 18H_2O \rightarrow CeO_2 \qquad \text{Eq. 2}$$

wherein $CeO_2$ and $Co_2O_3$ are formed separately from precipitated particles and are uniformly mixed together so as to create a catalyst structure depicted in FIG. 2B.

Figure 4A:
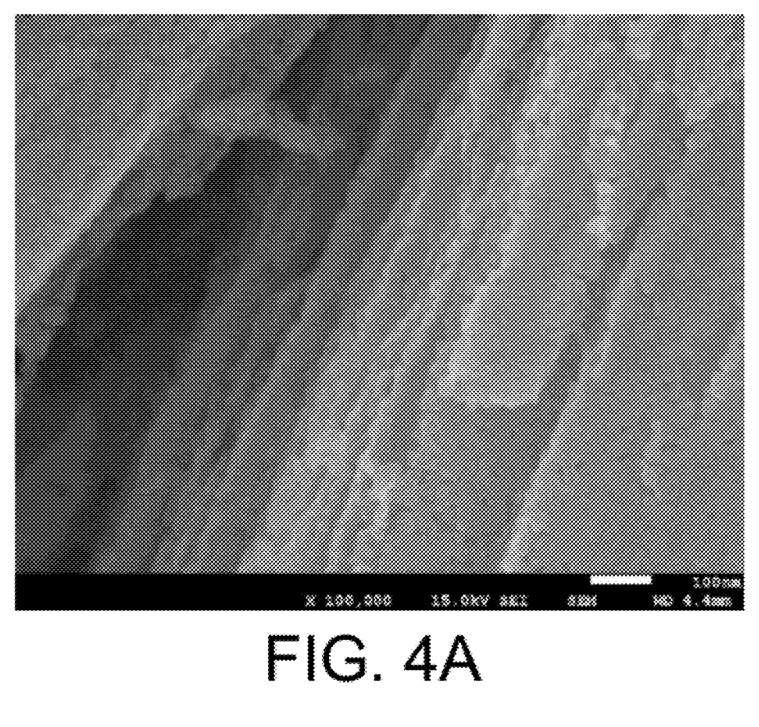
FIGS. 4A and 4B are photomicrographs of catalytic materials, in accordance with features of the present invention
Figure 4B:
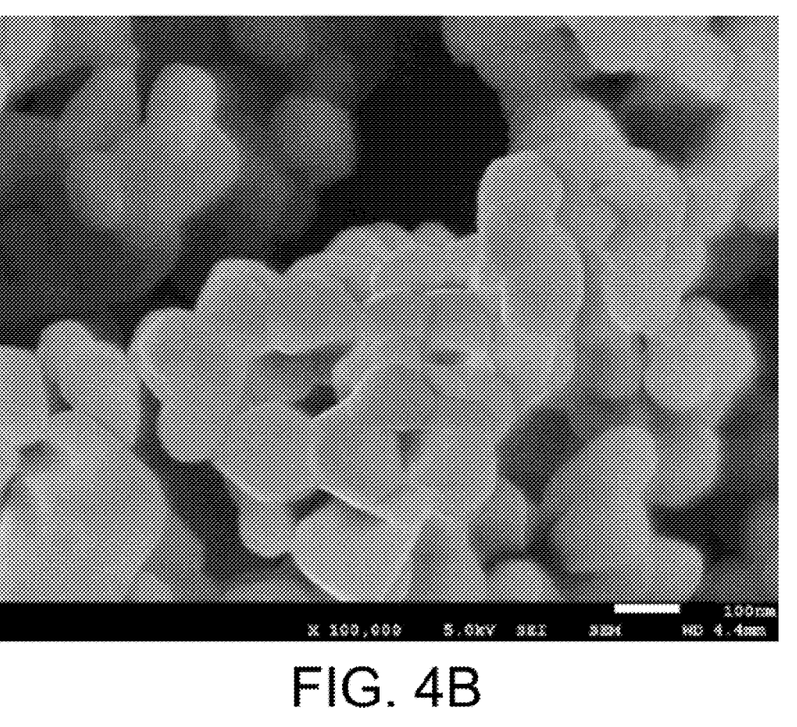

FIGS. 4A and 4B are photomicrographs of catalytic materials produced via the invented method. FIG. 4A is a photomicrograph of catalytic material produced with $K_2SO_4$. The particles are observed to be plates having irregular shapes. A single layer within the plates usually has a micron range thickness of less than 30 nanometers, and typically between about 10 nm and about 20 nm. These plates are comprised of many stacked layers, such that the planes formed by each of the layers are coplanar to each other. As such, the formulation protocol utilizing $K_2SO_4$ as taught herein generates nanosheets.

FIG. 4B is a photomicrograph of catalytic material produced without $K_2SO_4$. The catalyst depicted here is of a completely different morphology than that depicted in FIG. 4A, which is to say that the $Co_3O_4$ synthesized without $K_2SO4$ appears to be agglomerates with no layer stacks. The sizes of the individual particles are approximately 100 nm in diameter.

The invented catalysts may be deposited or otherwise supported on substrates. These support substrates are used to facilitate more robust application of catalysts in flue gas streams whereby the substrates may define grids overlayed by the catalysts. For example, active catalyst along with other active catalysts are first coated on support materials to form a composite. Then, these final composites are coated or overlaid on substrates (in instances where gaseous oxidation reactions are envisioned) or filters.

A myriad of support substrates are suitable, including, but not limited to high surface area materials such as alumina, ceria, silica, stannic oxide zirconia, titania, magnesium oxide, and combinations thereof. Preferably, co-precipitation of support material is preferred over the addition of support precursor materials into a Co- and K-containing mixture. Examples 15-21 in FIG. 6 elaborate on catalyst formulations coated on support materials.

When metal oxides of support materials are added into Co-precursor solutions (items 32, 34 in FIG. 3), precipitates 40 can be collected by filtering or rotary evaporating. When filtering is performed, precipitates do not contain $K_2SO_4$ as $K_2SO_4$ dissolved in water is drained. With rotary evaporation, on the contrary, precipitates will retain $K_2SO_4$ as water only is evaporated.

The invented catalyst is applicable for a myriad of oxidation scenarios, not just the ignition of soot. For example, the catalyst can be applied to process engineering situations, for use in power plants, on ships, construction and mining equipment, etc. Also, the catalyst may be applied to HC, VOC and CO oxidation scenarios as well.

Figure 5A:
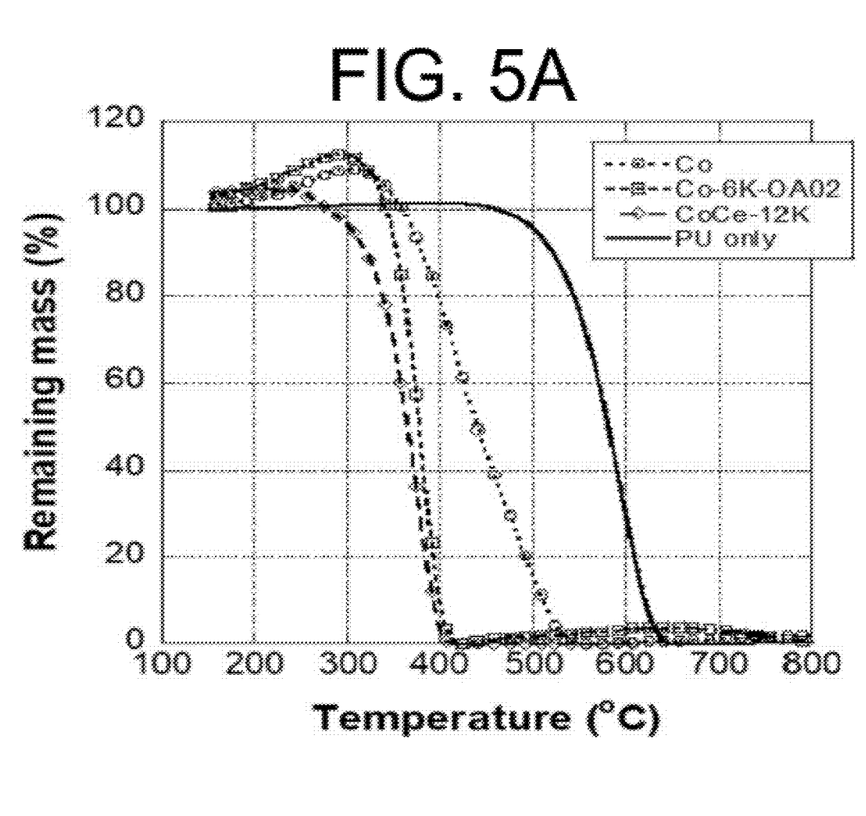
FIGS. 5A and 5B are TGA results of various catalytic materials, in accordance with features of the present invention.
Figure 5B:
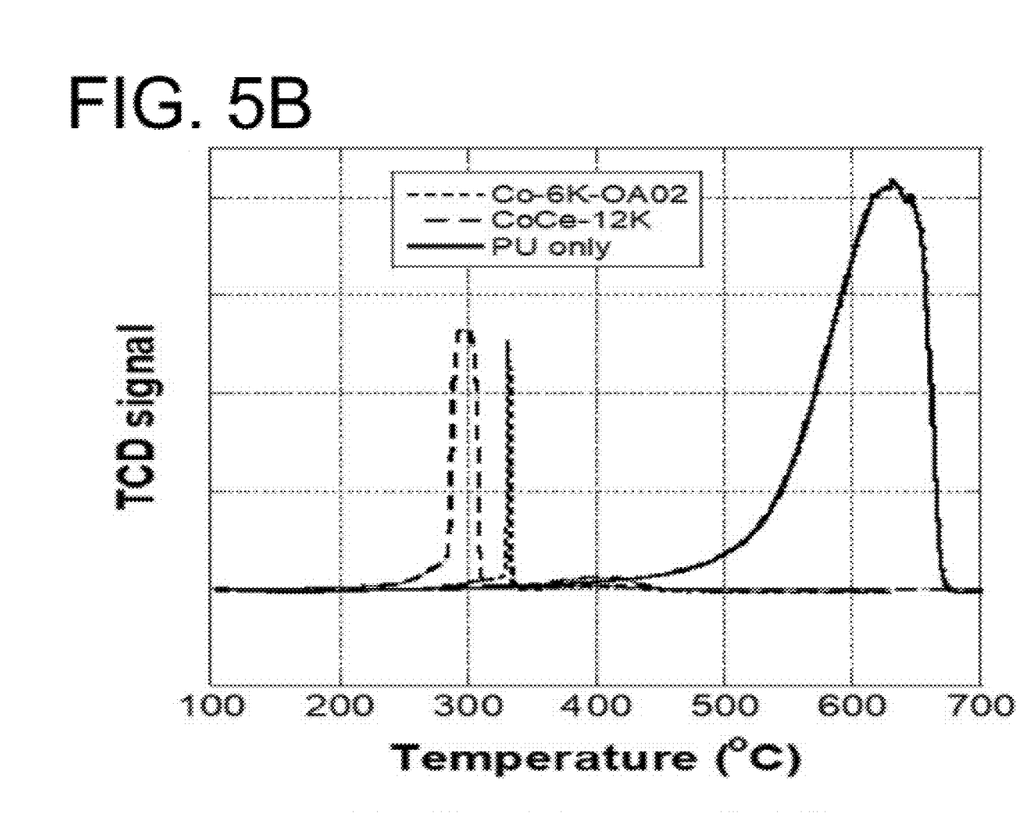

FIGS. 5A and 5B are graphs of thermogravimetric analysis of the invented catalysts. The analysis was performed to evaluate the performance of soot oxidation by the catalysts. FIG. 5A is a graph of non-isothermal analysis performed between 150 and 800° C. This graph shows that soot was almost oxidized at about 410° C. with the $Co_3O_4$ catalyst when $K_2SO_4$ is used. This is almost 250° C. lower than the original carbon black (PU) sample and 120° C. lower than the catalyst with no $K_2SO_4$ used. ("PU" is the typical designation for carbon black.)

Since TGA, which measures mass changes, cannot represent real oxidizing environments as soot oxidation occurs by a diffusion process, Temperature Programmed Oxidation (TPO) was also performed for simulating real oxidizing environments as indicated in FIG. 5B. While the oxidizing temperature range from TPO is comparable to that in TGA for PU only as noted in FIG. 5A, it is much lower for the catalysts proposed from this invention with TPO results; cobalt oxide shows that the peak oxidation was observed at around 330° C. with the start of oxidation at 270° C.

Moreover, soot oxidation occurred at 235° C., with the peak oxidation temperature of 295° C., when cobalt/cerium oxides are used.

The superior performance of the catalyst synthesized from $CoCl_2$ precipitation in the presence of $K_2SO_4$ is related to its novel nanosheet structure and surface properties, even though the catalyst-soot contact is minimal. There are two ways to examine soot oxidation reactivity. One is a tight contact by grinding a mixture of soot and the catalyst in a mortar or ball-milling the mixture. The other is a loose contact by weakly mixing the mixture using a spatula. Since soot is accumulated on catalyst layers in filters in real combustion situations, loose contact provides actual oxidation environments.

EXAMPLES

FIG. 6 is a chart comparing neat carbon black (PU) to invented catalyst. FIG. 6 also contains reaction conditions, solvent types and molarities used in the invented protocol. The "Name" column in FIG. 6 reflects the relative molarity of reactants used to generate the particular catalyst, designated as Example 1, 2, 3 . . . etc. Generally, none of the final catalysts contain alkali metals such as potassium and sodium when filtering was used for solids collection. Generally, only impurities which are not washed away will be included in final product.

As can be seen, light off temperatures were as low as about 320° C. for 10 percent oxidation, and about 390° C. for 90 percent oxidation, this despite that all of the samples depicted in FIG. 6 were prepared to interact with the soot loosely, such that the soot merely (and continuously) accumulates onto the surfaces of the catalyst. This is because the invented nanosheet structure affords higher surface area compared to prior art catalysts, and enhanced thermal conductivity across its entire surface. Improved redox behavior (oxygen uptake/intake capability), and optimized acid sites seem to be responsible for high catalyst activity. These properties enhanced formation of oxygen vacancies and generate surface oxygen at the catalyst surface.

As noted in the TGA results of FIG. 6, surrogate soot (Printex-U, PU) shows T10, T50 and T90 of about 521° C., 581 and 620° C., respectively, which are temperatures at which 10, 50 and 90 percent, respectively, of soot oxidation is achieved.

Based on thermogravimetric analysis (TGA) tests shown in FIG. 6, the light off temperature (T50, temperature in which 50 percent of oxidation is achieved) can be lowered from above 600° C. to below about 400° C., and at an oxygen concentration of no more than 8 percent. T50 is further reduced under $NO_2/O_2$ oxidizing environments. Based on temperature programmed oxidation (TPO) results in FIG. 5B, the peak oxidation temperatures could be achieved under 350° C. with this invention.

The following numbered examples should be read in the context of the Example numbers listed along the left column in FIG. 6.

Example 1

Cobalt chloride ($CoCl_2$) and $K_2SO_4$ were dissolved in distilled water of 40 ml in the molar ratio of 1:3 (Co:K=1:6, Co of 0.1 M). The reaction mixture was heated to 60° C. and maintained for 2 hours while vigorously stirring. 0.1 M oxalic acid dissolved in ethanol of 20 ml was poured into the reaction mixture. Pink precipitates were formed immediately and this mixture was stirred for 2 hours. The pink precipitates were filtered and washed with distilled water. The pink solids were dried at 120° C. overnight and calcined at 600° C. for 5 hours before use.

Example 7

Cobalt chloride ($CoCl_2$) and $K_2SO_4$ were dissolved in distilled water of 40 ml in the molar ratio of 1:3 (Co:K=1:6, Co of 0.1 M). The reaction mixture was heated to 60° C. and maintained for 2 hours while vigorously stirring. 0.2 M oxalic acid dissolved in ethanol of 10 ml was poured into the reaction mixture. Pink precipitates were formed immediately and this mixture was stirred for 2 hours. The pink precipitates were filtered and washed with distilled water. The pink solids were dried at 120° C. overnight and calcined at 600° C. for 5 hours before use. When oxalic acid concentration was compared for 0.2, 0.1 and 0.04 M, soot oxidation performance was better in the order of 0.2 M>0.1 M>0.04 M. Cobalt oxide synthesized with 0.2 M oxalic acid under the proposed invention significantly lowered soot oxidation temperatures as T10, T50 and T90 of about 353, 377, and 400° C.

Example 13

When cobalt oxide generated in Example 7 was promoted by cerium oxide, light off temperatures were even lower: T10, T50 and T90 of about 321, 365, and 392° C., respectively. Cobalt chloride ($CoCl_2$), Cerium nitrate hexahydrate ($Ce(NO_3)_3 \cdot 6H_2O$) and $K_2SO_4$ were dissolved in distilled water of 60 ml in the molar ratio of 1:1:6 (Co:Ce:K=1:1:12, Co of 0.1 M). The reaction mixture was heated to 60° C. and maintained for 2 hours while vigorously stirring. 0.1 M oxalic acid dissolved in ethanol of 40 ml was poured into the reaction mixture. Pink/white precipitates were formed immediately and this mixture was stirred for 2 hours. The pink/white precipitates were filtered and washed with distilled water. The solids were dried at 120° C. overnight and calcined at 600° C. for 5 hours before use.

Example 19

T10 in this catalyst was 316° C. This extremely low light off temperature (similar to that seen in Example 13) and particularly when compared to state of the art is due to the multi-plate structure of the catalyst resulting from the synergist effect of potassium in the reaction mixture.

The invented catalyst results in spontaneous oxidation of soot when the catalyst is maintained at 350° C. FIG. 6 also shows the incorporation of cerium, copper and manganese in bi-metal forms of the catalyst.

Figure 7:
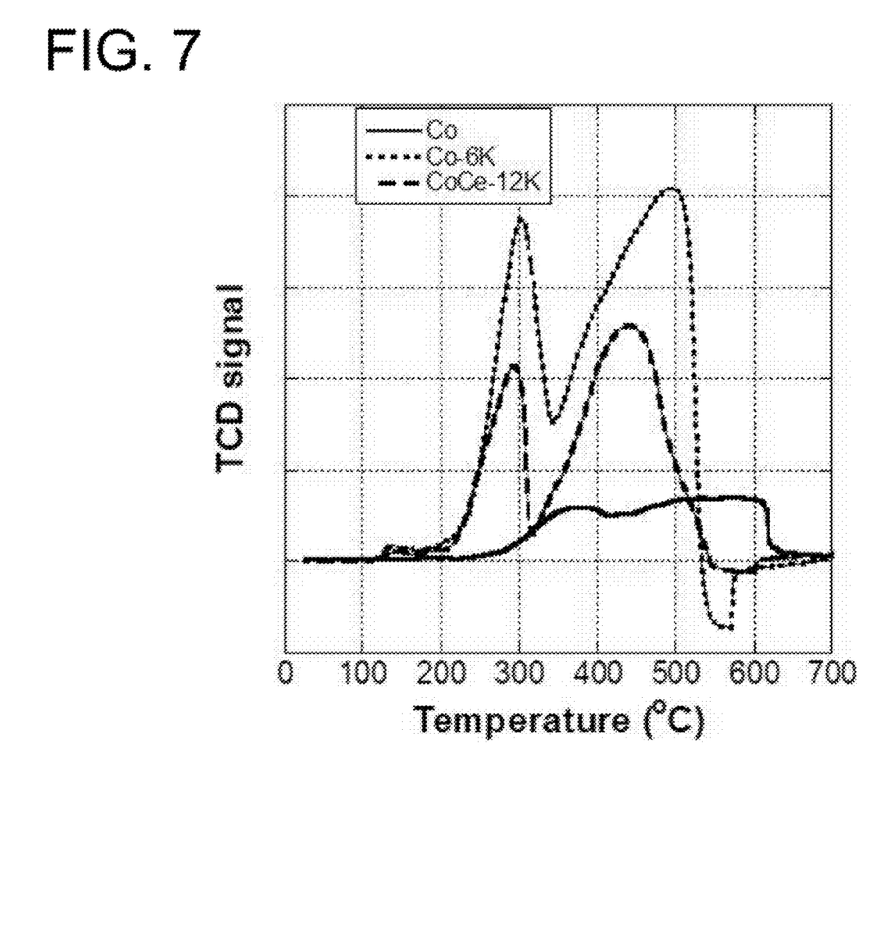
FIG. 7 is a graph showing temperature programmed reduction of the invented catalysts, in accordance with features of the present invention.

A salient feature of the invented catalyst is its ability to readily release surface oxygen (described above as ionized oxygen) at relatively lower temperatures to maximize soot oxidation. The high reducibility shown in FIG. 7 depicting high $H_2$ consumption peaks at low temperatures, indicates that the catalyst lowers oxidation temperatures by easily releasing oxygen at temperatures below 300° C. This may be due to the acidity and other chemical environments created by the addition of $K_2SO_4$. Specifically, FIG. 7 is a graph of temperature programmed reduction (TPR) results of the invented catalysts with temperature ramping at 10° C./min under 1 percent Hydrogen gas in Argon.

In summary, the invented catalysts (either $Co_3O_4$ or $Co_3O_4/CeO_2$) lowered oxidation temperatures by 300° C., which is remarkably active comparted to state of the art catalysts. Since diesel exhaust temperatures can reach 250° C. to 450° C. at normal operating conditions, soot is efficiently oxidized in the presence of these catalysts with no additional post fuel injection.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments.

Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for oxidizing a chemical, the method comprising contacting the chemical to a cobalt-containing catalyst defining a plurality of flat substrates forming a monolith, wherein any one of the substrates has a thickness no greater than about 30 nm.

2. The method as recited in claim 1 wherein the chemical is soot and about half of the soot is oxidized at about 300° C.

3. The method as recited in claim 1 wherein the catalyst is adsorbed to a support substrate.

4. The method as recited in claim 1 wherein the catalyst is a cobalt containing compound selected from the group consisting of $CoCl_2$, $Co(NO_3)_2.6H_2O$, $Co(CH_3COO)_2.4H_2O$, and combinations thereof.

5. The method as recited in claim 1 wherein the chemical is soot and the soot is oxidized at below about 400° C.

6. The method as recited in claim 1 wherein the chemical is CO, or $CH_4$, or non-methane total hydrocarbons, or volatile organic compounds, or soot, or combinations thereof.

7. The method as recited in claim 1 wherein the chemical is loosely mixed with the catalyst.

8. A catalyst for oxidizing chemical, the catalyst having a morphology comprising layered plates, wherein any plate is no more than 30 nm thick.

9. The catalyst as recited in claim 8 wherein the plates are stacked to form a monolith.

10. The catalyst as recited in claim 9 wherein the catalyst contains $Co_3O_4$.

11. The catalyst as recited in claim 10 wherein the catalyst is adsorbed to a support substrate.

12. The catalyst as recited in claim 10 wherein the plates comprise a plurality of spheres having diameters between 10 nm and 30 nm.

13. The catalyst as recited in claim 12 wherein voids exist between the spheres adapted to receive the chemical.

14. A method for producing an oxidation catalyst, the method comprising:
a) combining a cobalt compound with an alkali metal compound to create a solution;
b) contacting the solution with a precipitating agent for a time and at a temperature sufficient to oxidize the cobalt compound and form a precipitate of the cobalt compound as an intermediate;
c) filtering the precipitate; and
d) calcining the filtered precipitate.

15. The method as recited in claim 14 wherein the cobalt compound is selected from the group consisting of $CoCl_2$, $Co(NO_3)_2.6H_2O$, $Co(CH_3COO)_2.4H_2O$ and combinations thereof.

16. The method as recited in claim 14 wherein the alkali metal compound is a salt selected from the group consisting of $K_2SO_4$, $KNO_3$, $KCl$, $K_2S_2O_8$, $Na_2SO_4$, $LiSO_4$, $MgSO_4$, $SnSO_4$, $CoSO_4$, $Cs_2SO_4$, $MnSO_4$ and $CrSO_4$, and combinations thereof.

17. The method as recited in claim 14 wherein the precipitating agent is oxalic acid, citric acid, NaOH, $(NH_4)_2C_2O_4$, urea, and combinations thereof.

18. The method as recited in claim 14 wherein a reaction promoter is added with the precipitating agent.

19. The method as recited in claim 18 wherein the promoter is a metal selected from the group consisting of Ce, Mn, Cu, Cr, Ag, La, Pr, and combinations thereof.

20. The method as recited in claim 14 wherein the molar ratio of K/Co is selected from between about 1:1 and 20:1.

* * * * *